Figure 1:
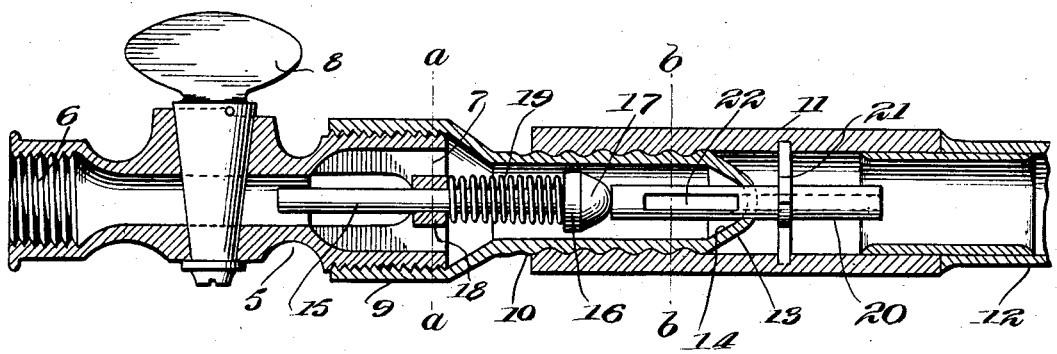

W. GIEDSTED.
HOSE GAS COCK.
APPLICATION FILED JAN. 16, 1915.

1,177,508.

Patented Mar. 28, 1916.

Inventor
Walter Giedsted

By Victor J. Evans
Attorney

Witnesses
Frederick W. Moran
Edward Yeager

UNITED STATES PATENT OFFICE.

WALTER GIEDSTED, OF BROOKLYN, NEW YORK.

HOSE GAS-COCK.

1,177,508.  Specification of Letters Patent.  Patented Mar. 28, 1916.

Application filed January 16, 1915. Serial No. 2,728.

*To all whom it may concern:*

Be it known that I, WALTER GIEDSTED, a citizen of the United States, residing at Greenpoint, Brooklyn, in the county of Kings, and State of New York, have invented new and useful Improvements in Hose Gas-Cocks, of which the following is a specification.

This invention relates to an automatic cut off for gas cocks of that character with which a flexible gas conveying tube is adapted to be associated. The general object of the invention is the provision of a gas cock having an auxiliary valve, held opened by a controlling element carried by the flexible tube, when the tube is operatively associated with the cock, the valve automatically operating to cut off the flow of gas when the tube is disengaged from the cock with the main valve opened.

Other objects will appear as the nature of the invention is better understood from the following description when taken in connection with the accompanying drawing, the invention residing in the specific construction, combination and arrangement of parts hereinafter more fully described.

Figure 2:
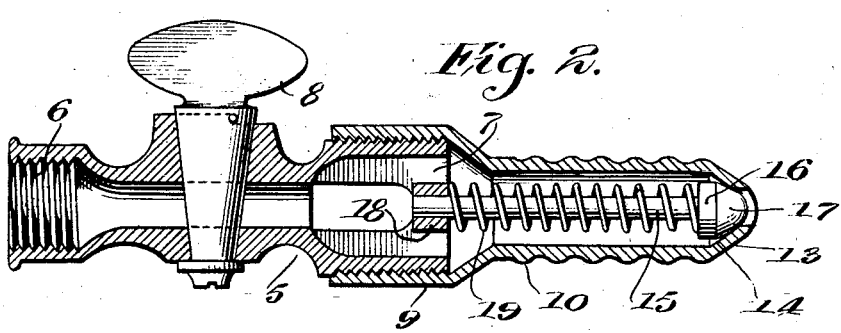
Figure 3:
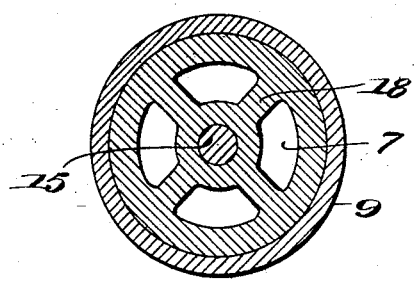
Figure 4:
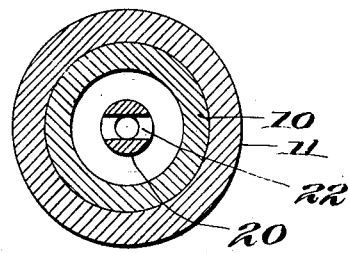

In the drawing forming part of this application like numerals of reference indicate similar parts in the several views and in which:

Figure 1 is a longitudinal sectional view showing the opened position of the auxiliary valve. Fig. 2 is a similar view showing the valve closed. Fig. 3 is a transverse sectional view on line $a$—$a$ of Fig. 1. Fig. 4 is a similar view on line $b$—$b$ of Fig. 1.

Referring more particularly to the drawing 5 indicates generally a gas cock, comprising an inlet 6, an outlet 7, and a valve plug 8 for controlling the flow of gas.

Threadedly secured on the outlet 7 is the enlarged end 9 of a nipple, the remaining portion 10 thereof being received by the flexible coupling 11, of the tube 12 for operatively associating the parts. The free end of the nipple is reduced as at 13 to provide a valve seat 14 for the auxiliary valve, the latter being automatically operated in the manner presently described, to cut off the flow of gas should the tube 12 become casually disengaged from the nipple, while the valve plug 8 is open.

The auxiliary valve comprises a stem 15, having a flange 16 at one end thereof to which is secured a rubber tip 17 constituting the valve proper. The stem 15 is slidably mounted through a spider 18 arranged within the outlet bore 7 for holding the auxiliary valve centrally positioned within the bore, and guiding the valve in its movement to opened and closed position. Encircling the stem 15 is an extensile spring 19 having one end bearing against the flange 16 and its opposite end bearing against the spider 18 and operating to automatically close the valve against its seat 14, when the controlling element 20 is moved out of engagement with the valve.

The controlling element 20 is centrally positioned within the flexible coupling sleeve 11, being fixed therein by means of the spider 21, the arms of the latter having their free ends embedded in the sleeve. The element 20 however, may be fixed relatively to the sleeve 11 in any suitable manner, but is disposed in alinement with the valve stem 15, so that when the sleeve 11 is associated with the nipple, the element 20 enters the restricted opening at the free end of the nipple for engagement with the valve to move the latter to opened position against the tension of the spring 19. The element 20 is hollow and provided with an elongated slot 22 adjacent the end that engages the valve, so that when the valve plug 8 is opened the gas flows into the nipple, entering the slot 22, and passes through the element 20 into the tube 12, it of course being understood that the outer end of the nipple is closed by the element 20, when the parts are operatively associated in the manner shown in Fig. 1. Now, should the tube 12, for any reason be disengaged from the nipple, while the valve plug 8 is open, the element 20 will be withdrawn therefrom, and the spring 19 will operate to move the auxiliary valve to closed position against its seat 14 thereby automatically cutting off the flow of gas.

It is believed that from the foregoing description the nature and advantages of the invention will be readily apparent, without requiring a more extended explanation and therefore the same has been omitted. However it is desired to be understood that various changes in the construction and arrangement of parts may be resorted to when desired as fall within the scope of the appended claim.

What I claim is:—

In a gas cock the combination with a casing having an inlet and outlet, a valve arranged therebetween, and a spider positioned within said outlet, of a nipple exteriorly threaded upon said outlet and projecting forwardly in advance thereof, said nipple having a reduced end portion forming a seat provided with a restricted opening, a valve rod slidably supported by said spider and movable within said nipple, a valve on one end of said rod, a spring encircling said rod and bearing against said spider and valve to hold the latter normally engaged against said seat, a flexible tube adapted to be connected with said nipple, a hollow tube centrally positioned with the flexible tube and fixed with relation thereto, said hollow tube passing through said restricted opening in the nipple to close the latter and to move said valve away from its side, and said hollow tube having a slot therein to establish communication between the nipple and said flexible tube.

In testimony whereof I affix my signature in presence of two witnesses.

WALTER GIEDSTED.

Witnesses:
MICHAL SHEVSKARITS,
EDITH MARCUS.